United States Patent [19]

Loubier et al.

[11] Patent Number: 5,297,945
[45] Date of Patent: Mar. 29, 1994

[54] PUMP FOR VISCOUS FLUIDS

[75] Inventors: Robert J. Loubier, Roanoke; Lawrence P. Zepp, Fort Wayne, both of Ind.

[73] Assignee: Xolox Corporation, Fort Wayne, Ind.

[21] Appl. No.: 963,136

[22] Filed: Oct. 19, 1992

Related U.S. Application Data

[63] Continuation of Ser. No. 518,803, May 4, 1990, Pat. No. 5,169,292.

[51] Int. Cl.⁵ .................................... F01C 1/18
[52] U.S. Cl. ........................................ 418/206
[58] Field of Search .......................... 418/206

[56] References Cited

U.S. PATENT DOCUMENTS

| | | | |
|---|---|---|---|
| 231,939 | 9/1880 | Shedd | |
| 647,951 | 4/1900 | Enyart | 418/206 |
| 2,360,833 | 6/1943 | Hammond | 418/206 |
| 2,368,019 | 1/1945 | Guibert et al. | 418/206 |
| 2,439,427 | 4/1948 | Guibert et al. | 418/206 |
| 2,897,765 | 8/1959 | Kitano | 418/206 |
| 3,274,894 | 9/1966 | Jünger | |
| 3,918,843 | 11/1975 | Douglas et al. | 417/17 |
| 4,165,818 | 8/1979 | Bernard | 222/53 |
| 4,490,592 | 12/1984 | Haile | 200/81.9 |
| 4,740,140 | 4/1988 | Benson | 417/63 |
| 4,874,012 | 10/1989 | Velie | 137/557 |
| 4,955,785 | 9/1990 | Cohen | 415/26 |
| 5,019,678 | 5/1991 | Templeton et al. | 200/81.9 |

*Primary Examiner*—Richard A. Bertsch
*Assistant Examiner*—Charles Freay
*Attorney, Agent, or Firm*—Barnes & Thornburg

[57] ABSTRACT

An oval gear pump for shear-sensitive fluids particularly suited for use in dispensing metered amounts of food syrups, condiments, or other thick or viscous liquids. The viscosity of some of such materials tends to degrade when excessive agitation is incurred. The gear pump minimizes such agitation by sweeping integrated masses of substantial volume between the inlet and the outlet. The pumping system also provides a flow-sensing device including a tubular magnet movable against spring pressure by fluid flow to an operated position. When the magnet is in the operated position, an adjacent external switch is operated to produce a signal indicating flow. The pumping system is particularly adapted for use in connection with ice cream dispensing machines.

7 Claims, 4 Drawing Sheets

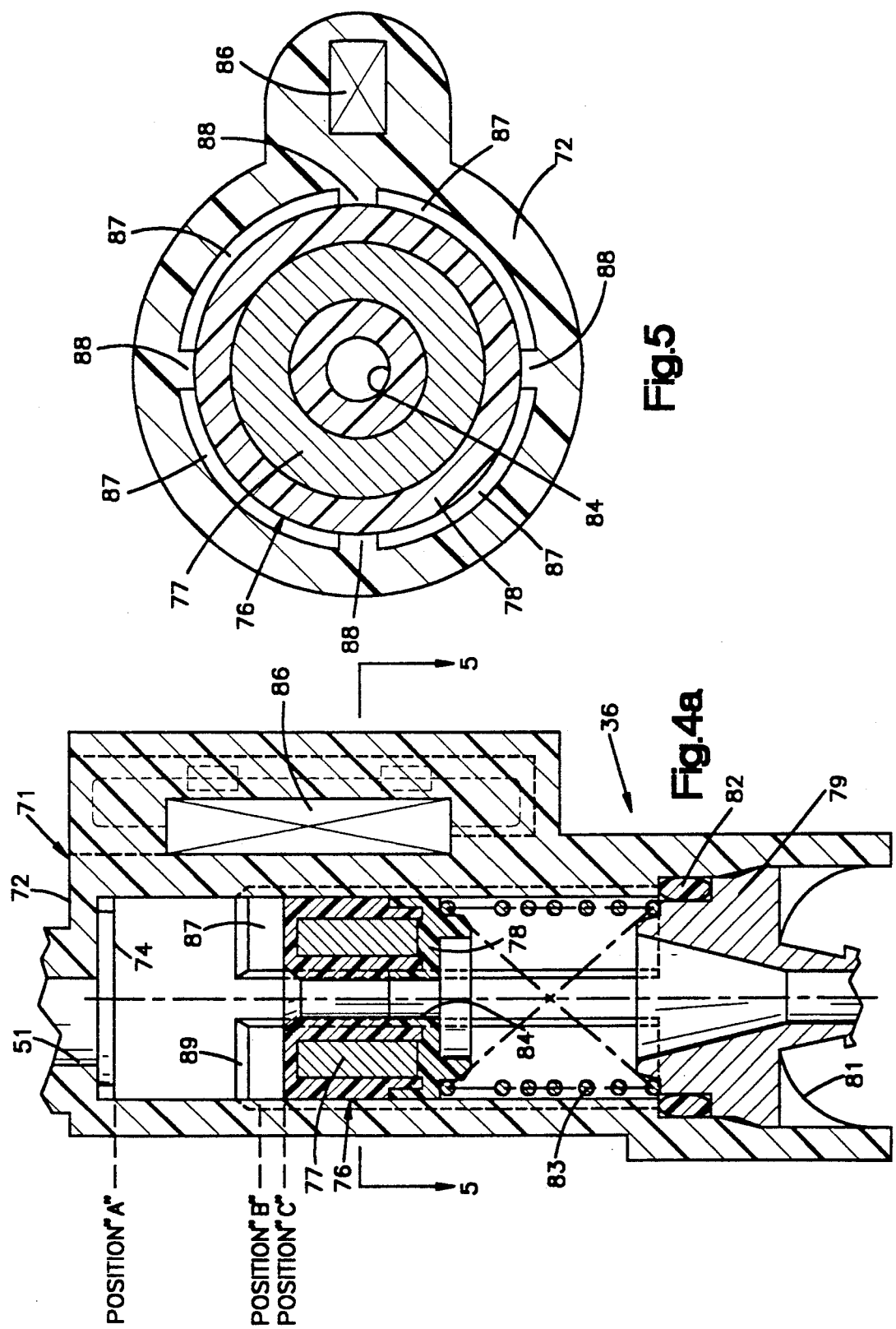

PUMP FOR VISCOUS FLUIDS

This is a continuation of application Ser. No. 07/518,803, filed May 4, 1990, now U.S. Pat. No. 5,169,292.

BACKGROUND OF THE INVENTION

This invention relates to a novel and improved pump apparatus and method for dispensing viscous fluids such as flavored food syrups.

Prior Art

Attempts to dispense metered amounts of viscous food syrups by utilizing peristaltic pumps have been made without success, such pumps employing continuous tubes selectively compressed by means of rollers. Spur gear pumps have been tried, also without success. As to each of these pumps, the dispensing of non-viscous liquids, such as water, could be performed satisfactorily; however, as viscosity was increased, dispensing became more difficult, or impossible.

The pumping of such highly viscous syrups is difficult. Because of the viscosity, it is difficult to draw the syrup into the pump. Also, the shear sensitivity of some materials requires that the pump function with a minimum of agitation.

It is also necessary to provide a pump which can be constructed of food-safe materials which do not contaminate the syrup in any way.

The present invention provides a syrup pump having oval gears in combination with a magnetic flow sensor. Oval gear pumps and motors are known in the prior art. For example, U.S. Pat. Nos. 231,939; 2,368,019; 2,439,427; and 3,274,894 all disclose such devices.

SUMMARY OF THE INVENTION

The present invention provides a novel and improved method and apparatus for pumping viscous fluids such as flavored syrups for ice cream.

In accordance with one important aspect of this invention, a novel and improved oval gear pump is provided to pump metered quantities of highly viscous fluids, such as flavored syrups. The pump is structured to minimize the flow restrictions into the pump, so that the fluid is efficiently drawn into the pumping chamber. The pump is also structured so that a minimum amount of agitation of the viscous fluid occurs. An oval gear pump provides substantial displacement during each revolution. Therefore, the pump can be operated at relatively low speeds and still produce adequate output volume. Substantial amounts of the fluids are swept as single integrated masses around the pump housing from the inlet to the outlet. This minimizes the agitation of the fluid as it passes through the pump, and minimizes the tendency for reduction in viscosity of shear-sensitive fluids, such as flavored syrup. As used herein, the phrase "shear-sensitive" is intended to describe a characteristic of a fluid in which some desired property, such as its viscosity, is degraded when the fluid is subjected to substantial agitation.

In accordance with another important aspect of the invention, the pump apparatus includes a flow-sensing system which provides a signal establishing the presence or absence of flow. Normally, such sensing system is connected to terminate pumping if, for example, an obstruction prevents flow or the supply of fluid is exhausted. This permits the operator to correct any problem and ensures continued accurate dispensing.

In accordance with another aspect of this invention, an apparatus is provided in which the pump can be reversed. Momentary reversal of the pump at the end of each dispensing cycle ensures that the syrup that has been dispensed stops flow and does not continue to drip.

In the illustrated preferred embodiment, the pump includes a pair of meshing oval gears driven by a reversible electric motor. The electric motor is a relatively low voltage direct current motor. The speed of the motor is controlled to adjust the output volume of the pump by merely adjusting the voltage supplied to the motor. The pump is sized so that the required output is obtained at low operating speeds.

The pump housing is structured so that the inlet ports and outlet ports are large to minimize any resistance to flow. This ensures efficient movement of the syrup into and out of the pump and minimizes any tendency for agitation of the fluid.

The flow sensing system includes a tubular magnet located in the outlet or discharge passage of the pump. The magnet is spring-loaded toward a normal position. When flow occurs, the magnet is moved against the action of the spring to an operated position indicating that flow is occurring. A reed switch located adjacent to the magnet in the operated position is closed by the presence of the magnet and provides an output signal indicating that flow exists.

The passage in which the magnet is positioned is provided with peripherally spaced slots so that when the tubular magnet moves to the operated position, the zone around the tubular magnet is open for substantially increased volumes of flow with a minimum restriction to such flow. Because the magnet is tubular, some of the flow occurs through the center of the magnet, as well as around the periphery. The uncovering of the peripheral slots occurs as the magnet approaches its operated position. Such structure ensures the movement of the magnet to its operated position in response to relatively low flow rates but accommodates relatively high flow rates without significant additional movement of the magnet.

In the event that flow is terminated, the open center of the magnet allows the magnet to be quickly moved by its associated spring to its normal position spaced from the reed switch to indicate termination of flow. Also, this open center in the magnet allows reverse flow when at the end of each dispensing cycle the pump is momentarily reversed to ensure that the syrup does not continue to drip after the pumping operation is terminated.

These and other aspects of this invention are illustrated in the accompanying drawings, and are more fully described in the following specification.

BRIEF DESCRIPTION OF THE DRAWINGS

FIG. 4a is a fragmentary view, similar to FIG. 3, but illustrating the magnet in the operated position it assumes during normal flow of the viscous fluid; and FIG. 5 is a fragmentary cross section taken along line 5—5 of FIG. 4a, illustrating the peripheral grooves which allow substantially increased flow with a minimum of pressure drop once the magnet is moved to its operated position.

DETAILED DESCRIPTION OF THE DRAWINGS

Figure 1:
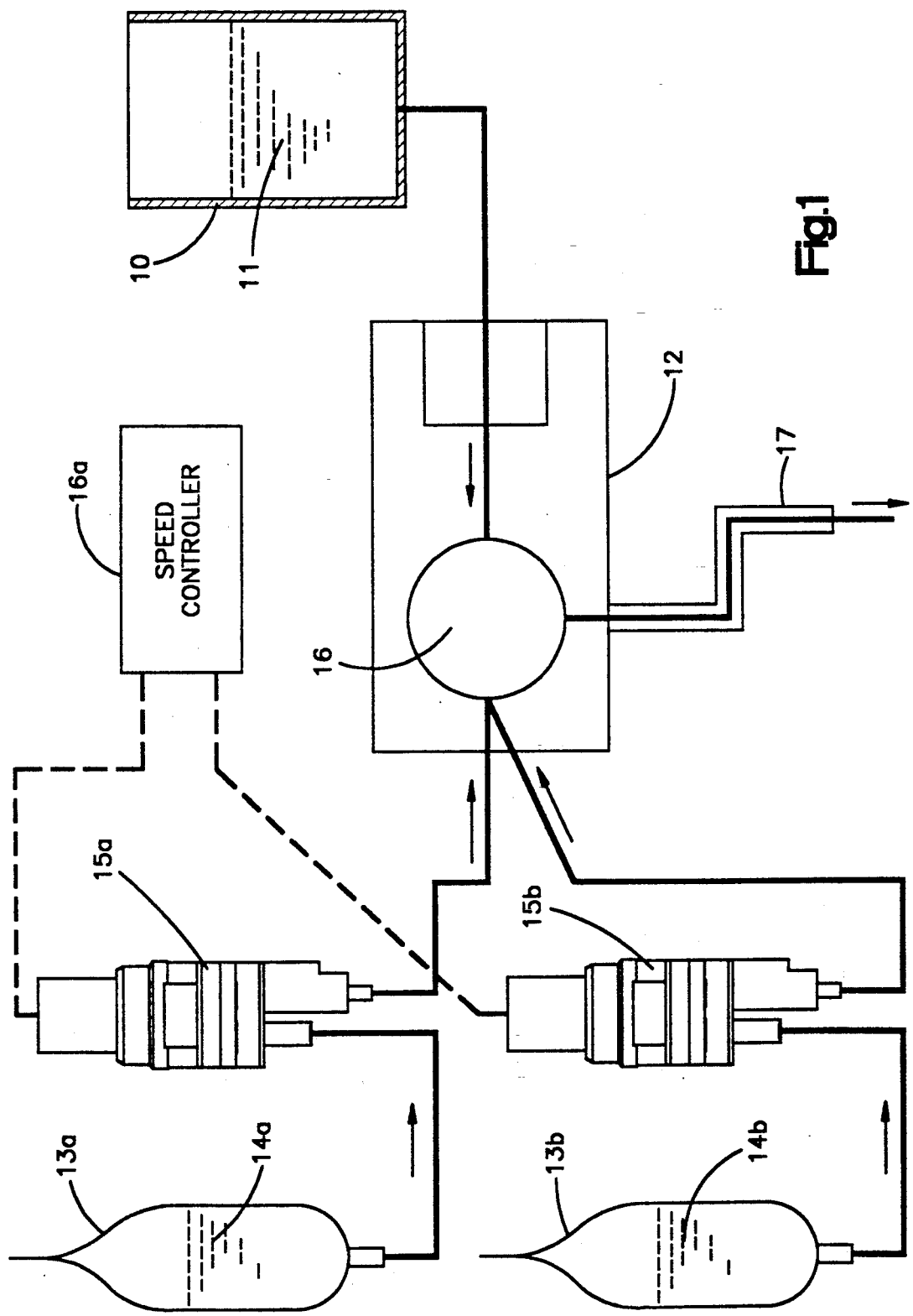
FIG. 1 is a schematic illustration of an ice cream dispensing machine incorporating this invention, the dispensing machine being shown as background environment in which this invention may be used.
Figure 2:
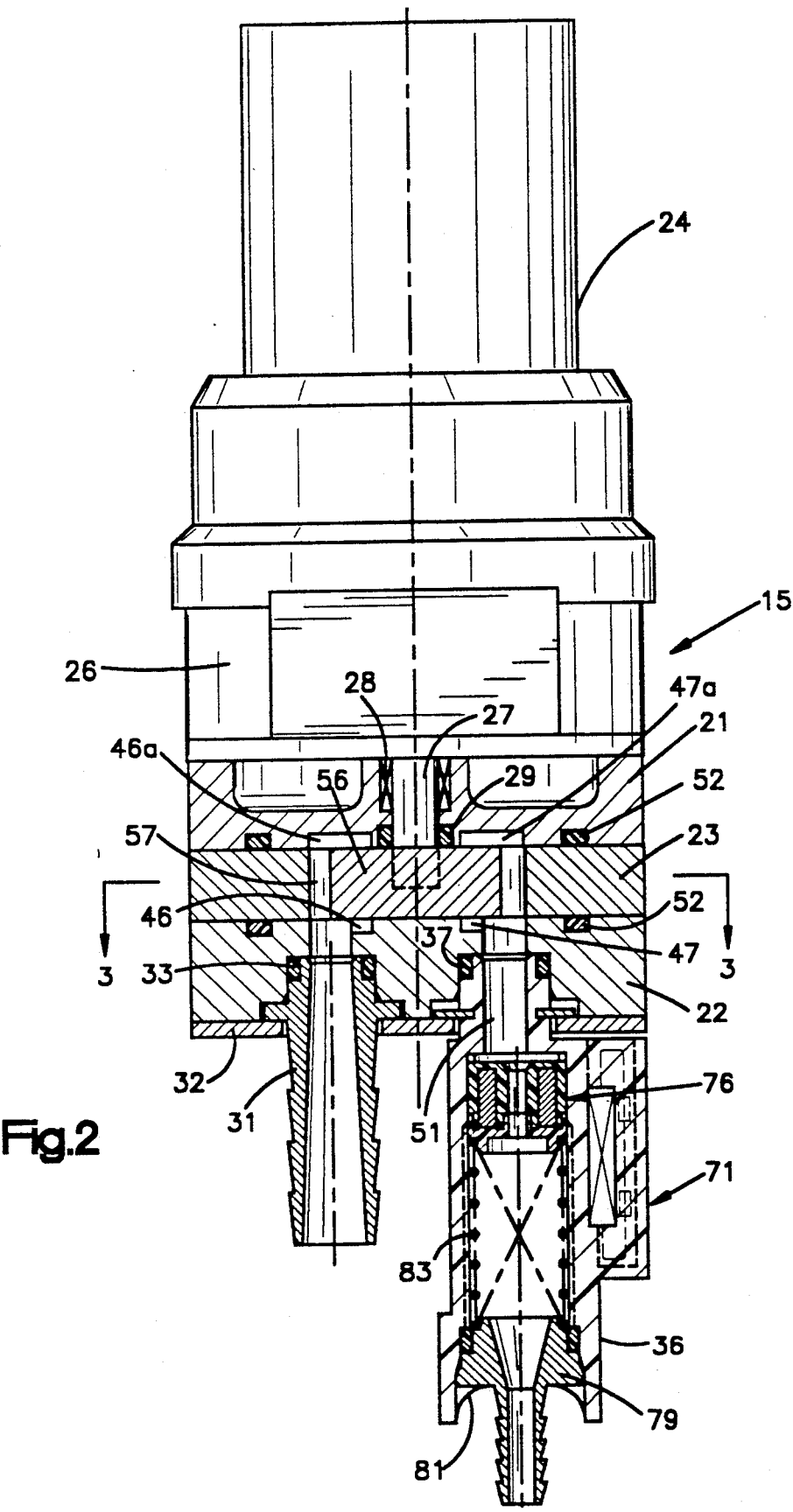
FIG. 2 is a side elevation, partially in section, substantially along section line 2—2 of FIG. 3, illustrating the general structural arrangement of the pump inlets and outlets and also the arrangement of the flow sensing system.

As typical background environment, FIG. 1 schematically illustrates an ice cream dispensing apparatus incorporating the present invention. In such an apparatus, a source 10 of ice cream base 11 is connected to a freezing and blending unit 12. The apparatus also includes two or more sources 13a and 13b of flavored syrup 14a and 14b. Typically, an apparatus of this type will include more than two sources of flavored syrup so that the apparatus is capable of producing and dispensing more than two flavors of ice cream. However, only two sources are illustrated to simplify the drawings.

Each of the two sources 13a and 13b of flavored syrup 14a and 14b is connected through an associated syrup pump assembly 15a and 15b, respectively, to the blending zone 16 within the freezing unit. In such zone, the syrup pumped by the selected pump 15a or 15b is blended with the ice cream base 11 and is dispensed from the unit through a spigot 17. A suitable speed controller 16a may be used to control speed and direction of pumps 15a and 15b.

Each of the syrup supply subsystems includes a source which may be in the form of a bag or other type of container and a syrup pump assembly. Since all of the syrup pump assemblies are identical, only a single pump assembly will be discussed in detail hereinafter, with the understanding that the description applies equally to each of the pump assemblies provided, and that one pump is provided for each flavor of syrup. The invention comprehends primarily the pump assembly.

Each of the pumps 15 has a structure best illustrated in FIGS. 2 through 5. Each pump provides a housing assembly consisting of a cover plate 21, a base plate 22, and a main body plate 23. The three plates are clamped together by bolts (not illustrated) and form a unitary assembly. Mounted on the cover plate 21 is an electric motor 24 providing an integral gear reducer 26 and an output shaft 27. The output shaft is journaled in a bearing 28 in the cover plate and extends through an O-ring type seal 29 in the cover plate into a cavity 66 defined in cooperation by the three plates 21, 22, and 23. Mounted on the base plate 22 is an inlet fitting 31 secured in position by a mounting plate 32. A seal 33 provides a fluidtight joint between the fitting 31 and the base plate 22. Also mounted on the base plate is an outlet assembly 36, also secured in position by the mounting plate 32 and providing a seal 37 to form a fluidtight seal between the outlet assembly and the base plate 21. The inlet fitting 31 and the outlet assembly 36 are adapted to be connected through hoses, respectively, to the associated source of syrup and the freezing and blending unit 12. The outlet assembly is provided with a flow sensing system described in detail below.

Figure 3:
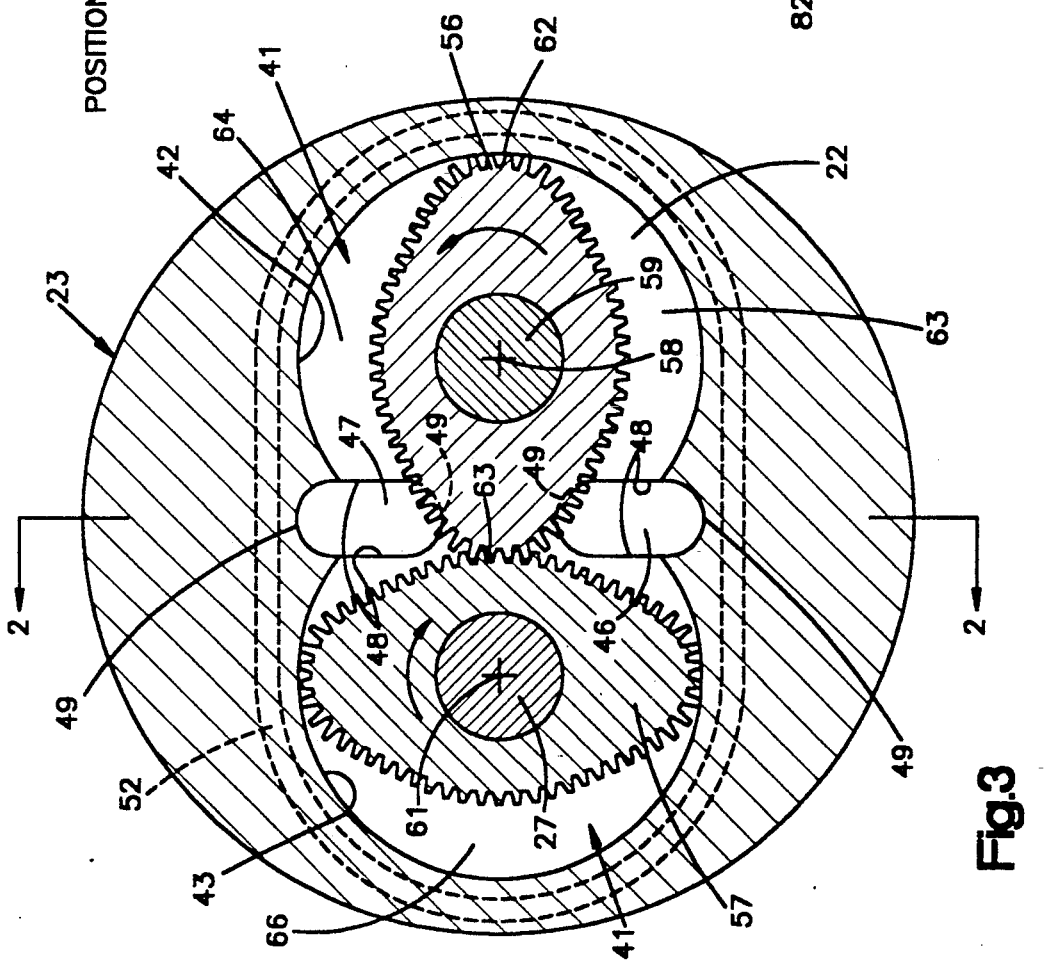
FIG. 3 is a schematic cross section, taken generally along line 3—3 of FIG. 2, illustrating the pumping chamber and the oval gears located therein.

Referring now to FIG. 3, the main body plate 23 provides a gear chamber 41 defined by two identical and intersecting circular wall sections 42 and 43. The two circular wall sections are positioned within the main body plate 23 and are formed with two spaced smaller part circular recesses 49 which communicate with an inlet 46 and an outlet 47 in plate 22. The inlet 46 and the outlet 47 are oval in shape, providing straight side walls 48 and radiused ends 49. In the illustrated embodiment, the inlet and outlet are symmetrically positioned on opposite sides of the pumping chamber 41 and are identical in size. Further, the inlet and outlet are aligned so that the elongated dimension of each extends toward the other. The aforesaid part circular recesses in plate 23 (also indicated by the numeral 49) register with inlet 46 and outlet 47. The inlet port 46 is open to the tubular inlet fitting 31 and the outlet port 47 is open to an outlet passage 51 formed in the outlet assembly 36.

Companion cavities 46a and 47a are provided in plate 21, which are of the same size and shape as inlet 46 and outlet 47 and are juxtaposed relative thereto.

The gear chamber 41 is closed on its upper side by the cover plate 21 and along its lower side by the base plate 22. Similar seals 52, respectively mounted in grooves formed in the cover plate and base plate, provide a fluidtight joint between those plates and the main body plate.

Journaled in the pumping chamber 41 are a pair of oval or elliptical gears 56 and 57. The gear 56 is journaled for rotation about an axis 58, which is the center of curvature of the circular wall section 42. A pivot shaft 59, which extends into a blind bore formed in the cover plate 21, serves as the pivot for the oval gear 56. The oval gear 57 is mounted on the output shaft 27 and rotates around an axis 61 which is located at the center of curvature of the circular wall section 43.

The two gears 56 and 57 provide peripheral teeth which intermesh so that the rotation of the oval gear 57 by the motor 24 also causes timed rotation of the gear 56. Oval gears generally are known in the prior art; however, it is preferable that the gears 56 and 57 be formed to provide a four-tooth seal at each longitudinal end 62 and 63 with the associated circular wall sections 42 and 43 as shown in FIG. 3. Furthermore, as is also shown in FIG. 3, ends 62 and 63 have radii of curvature approximately equal to the radii of curvature of circular wall sections 42 and 43. Finally, as is further shown in FIG. 3, the four-tooth seal on end 62 of gear 56 has pairs of teeth symmetrically spaced on either side of the major diameter thereof where the radii of teeth on opposite sides of the major diameter are equal to each other. Such oval gears provide improved sealing and result in improved pumping efficiency.

As the gears rotate from the position illustrated, the gear 56 rotates in an anticlockwise direction and the gear 57 rotates in a clockwise direction. As the end 62 of the gear 56 sweeps along the circular wall section 42, syrup is drawn in through the inlet port 46 into the zone 63 along one side of the gear 56. At the same time, syrup previously forced into a zone 64 along the other side of the gear 56 is pumped through the outlet port 47 out of the pumping chamber 41. The opposite end 63 of the gear 56 meshes with the gear 57 and prevents flow between the two zones 63 and 64.

While the rotation described above is occurring, a third zone 66, defined by the gear 57, in cooperation with the circular wall section 43, contains a substantial volume of syrup which is being swept along the wall section 43 as a separate but unitary mass of syrup having a substantial volume. During each full revolution of the two gears 56 and 57, four similar, separate masses of syrup are drawn into the pumping chamber through the inlet 46 and are delivered and pumped through the outlet 47. Consequently, a relatively small pump operating at relatively slow speeds can function to supply comparatively large quantities of syrup. Further, because the inlet and outlet ports are relatively large, even highly viscous fluids such as flavored syrups for ice cream or other condiments can be efficiently drawn in through the inlet port 46 and pumped out through the outlet port 47. Still further, because the syrup is moved as unitary masses having substantial volume, the syrup is not agitated to any material extent and the viscosity thereof does not deteriorate. Due to the oval gear configuration, only a minimum amount of the fluid is subjected to agitation as the gear teeth mesh and displace fluid.

In practice, flavored syrups for ice cream are shear-sensitive and have a viscosity that deteriorates if any substantial amount of agitation of the syrup occurs. However, with the present illustrated pump, in which substantial volumes of syrup can be delivered with a relatively small pump operating at slow speeds, agitation problems are not encountered and the syrup is pumped without degrading the viscosity thereof. For example, a pump having a housing about two inches in diameter operating at a speed between about 450 and 1000 rpm is capable of delivering an ounce of syrup every five to ten seconds at an outlet pressure of 20 to 30 psi. Similar size gear pumps having circular gears would require much higher rotational speeds and would agitate the syrup to such a degree as to cause degradation of the viscosity thereof.

Preferably, the motor 24 is a direct current, permanent magnet, low-voltage motor, such as a 24-volt direct current motor. Such motors are desirable, since they permit speed adjustment and consequent syrup output adjustment by merely changing the voltage applied to the motor by the speed controller 16a. Further, they permit motor reversal by merely reversing the polarity of the electrical potential applied to the motor.

Figure 4:
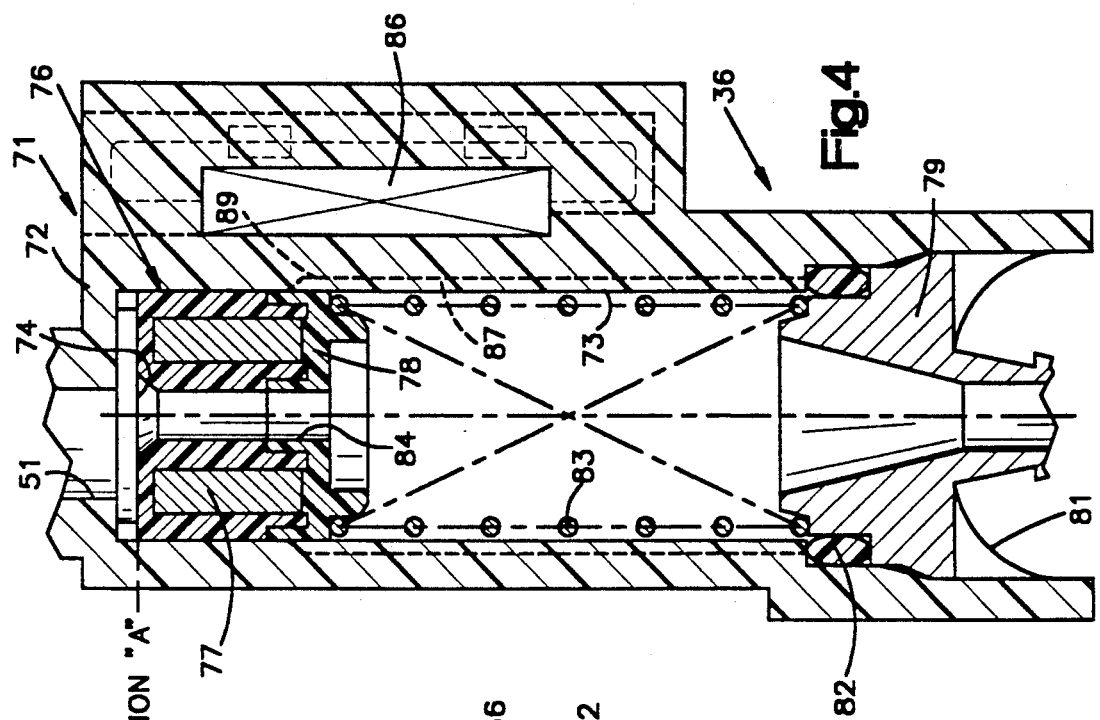
FIG. 4 is an enlarged, fragmentary view, illustrating the flow sensor in the position it assumes when flow is not present.

In order to ensure that proper syrup flow is occurring, a flow sensor 71 is provided in the outlet assembly 36. The flow sensor 71 is best illustrated in FIGS. 4, 4a, and 5. The outlet assembly 36 includes a sensor housing 72 providing the passage 51 at its upper end and defining an enlarged passage 73 extending from a shoulder 74. Mounted in the passage 73 is a tubular magnet assembly 76 consisting of a tubular permanent magnet 77 encased within a tubular plastic housing 78 which completely isolates the magnet itself from the syrup flowing through the outlet assembly. The lower end of the housing 72 is closed by an outlet fitting 79 which is secured in position in the housing by retaining ring 81 at the lower end thereof. A seal 82 provides a fluidtight joint between the housing 72 and fitting 79.

A spring 83 extends between the fitting 79 and the tubular magnet assembly 76, and normally maintains the magnet assembly 76 in the uppermost position "A" illustrated in FIG. 4 substantially against the shoulder 74. However, when syrup is flowing at a maximum rate, a sufficient pressure is developed on the upper side of the magnet assembly 76, to move it against the action of the spring to an operated position "C" illustrated in FIG. 4a. The center opening 84 in the magnet is sufficiently small so that even though syrup flow exists, a sufficient pressure drop occurs across such opening to overcome the force of the spring 83 and move the magnet down to the operated position. In the operated position, the magnet is adjacent to a reed switch 86 which is operated from a normally open position to a closed position by the presence of the magnet assembly 76 in the operated position of FIG. 4a.

In order to minimize the flow restriction provided by the magnet assembly 76 in normal pumping operation, the housing 72 is formed with peripherally spaced grooves 87 between lands 88. As best illustrated in FIG. 5, four lands 88 laterally support the magnet assembly 76 and substantial flow of syrup around the magnet assemblies can occur through the four grooves 87. The grooves 87 extend upwardly to ends 89, as best illustrated in FIGS. 4 and 4a, so that when the magnet assembly 76 is in its normal upper position "A" which it assumes when no flow is occurring, the magnet assembly prevents any flow through the grooves 87. However, when the flow is at a minimum rate, the magnet assembly moves to its minimum operated position "B" in FIG. 4a, the ends of the grooves are opened, and flow occurs around the magnet assembly, as well as through the central passage 84 therein.

With this structure, a flow sensing system is provided which is sensitive to very low flow rates, but which does not produce any substantial pressure drop when higher flow rates are encountered. A relatively slow flow rate will produce movement of the magnet assembly 76 against the spring 83 until the ends of the grooves are uncovered in position However, when this occurs, even greater flow rates will not produce any significant increase in the pressure drop across the flow sensor because the grooves provide substantial cross section for relatively unrestricted flow, position "C".

The reed switch, as mentioned previously, is a normally open switch which is closed when flow of syrup occurs by the movement of the magnet to the operated position (FIG. 4a). This reed switch is preferably connected in the control circuit of the motor so that in the event that flow through outlet passage 51 ceases, the motor is turned off. For example, if the supply of the particular syrup is exhausted, flow will not occur and the operation of the flow sensor will automatically terminate operation of the dispenser. A similar situation can occur if, for example, one of the hoses becomes crimped. In any event, the operation of the flow sensor to prevent dispensing informs the user that something is wrong. The positions "B" and "C" relative to the reed switch are always within the operating range of the reed switch.

The passage 84 serves another useful function. When the motor is shut off to stop the pump, the passage allows the spring 83 to return the magnet assembly 76 to its normal upper position in a rapid manner. If it were not for the passage, the highly viscous syrup would greatly delay the movement of the magnet assembly back to its normal upper position. Further, in most instances, it is desirable to permit the momentary reverse operation of the pump at the end of any dispensing cycle. For example, when the pressurized syrup is pumped to the dispensing zone, there is a tendency for the hoses to expand slightly due to the pressure. If the pump is merely stopped, this condition tends to cause a continued flow of a small amount of the syrup into the dispensing zone. To overcome this, the control system may be arranged so that after a dispensing cycle, the motor and pump are reversed momentarily to draw the syrup back away from the dispensing zone, thereby preventing any additional syrup from entering the dispensing zone. During such reverse operation, the passage 84 through the magnet allows reverse flow of the syrup.

With the present invention, a simple, reliable and efficient system is provided for pumping highly viscous fluids even when such fluids are shear-sensitive, such as the flavoring syrups used in ice cream. The pumps are capable of efficiently pumping highly viscous fluids without appreciable agitation of the fluid. Consequently, even shear-sensitive fluids such as typical flavoring syrups for ice cream can be efficiently pumped without degrading the viscosity of the syrup. While the invention has been disclosed primarily in connection with viscous liquids, it is to be understood that non-viscous liquids, such as water, can be dispensed with substantially the same efficiency.

Although the preferred embodiment of this invention has been shown and described, it should be understood that various modifications and rearrangements of the parts may be resorted to without departing from the scope of the invention as disclosed and claimed herein.

What is claimed is:

1. A pump comprising a gear chamber having first and second generally circular wall sections, first and second gears located within said chamber and disposed adjacent, respectively, the first and second wall sections, said gears being generally oval in shape and having teeth located about their periphery, wherein more than two teeth adjacent each longitudinal end of each gear are formed so as to sealingly engage a surface of said generally circular wall sections as the gears rotate within the gear chamber.

2. The pump according to claim 1, wherein at least four teeth adjacent each longitudinal end of each gear sealingly engage said surface of said circular wall sections.

3. A pump comprising a chamber having a first gear and a second gear located therein, said chamber having generally circular walls, said first gear and said second gear having teeth about their periphery, wherein the distal ends of more than two teeth adjacent each longitudinal end of each gear lie on a generally circular arc, said arc having a radius of curvature approximately equal to the radius of curvature of said circular walls, such that the distal ends of said teeth sealingly engage respective portions of the circular walls as the gears rotate within the chamber.

4. The pump according to claim 3, wherein the distal ends of at least four teeth immediately adjacent each longitudinal end of each gear lie on said arc.

5. A pump comprising a circular chamber and first and second gears located therein, said first gear and said second gear being generally elongate in shape, each said gear having a major and a minor diameter and a plurality of teeth spaced about its periphery, such that pairs of teeth are symmetrically spaced on either side of said major diameter, wherein the distance from the tip of each tooth to the center of its respective gear defines a radius, and wherein the radii defined by at least two teeth on each side of at least one end of the major axis are substantially equal to each other and to the radius of the circular chamber.

6. A gear for use in a pump, comprising:
  a generally elongate body, said body having a major diameter and a minor diameter;
  a plurality of teeth spaced about the periphery of said body, such that said teeth define a circumference of said gear;
  wherein portions of said circumference adjacent each end of said major diameter define a generally circular arc, each of said portions being defined by more than two teeth; and
  wherein the remaining portions of said circumference define a generally elongated arc.

7. The gear according to claim 6, wherein the four teeth immediately adjacent each end of said major diameter define said generally circular arc.

* * * * *